United States Patent
Chen et al.

(10) Patent No.: US 8,269,839 B2
(45) Date of Patent: Sep. 18, 2012

(54) HIGH-RESOLUTION IMAGE SENSING DEVICE AND IMAGE MOTION SENSING METHOD THEREOF

(75) Inventors: Jau-Yu Chen, Taipei (TW); Meng-Kun Chen, Kaohsiung County (TW); Yu-Cheng Sung, Taipei (TW)

(73) Assignee: Lite-On Semiconductor Corp., Taipei Hsien (TW)

( * ) Notice: Subject to any disclaimer, the term of this patent is extended or adjusted under 35 U.S.C. 154(b) by 358 days.

(21) Appl. No.: 12/748,730

(22) Filed: Mar. 29, 2010

(65) Prior Publication Data

US 2011/0157391 A1 Jun. 30, 2011

(30) Foreign Application Priority Data

Dec. 31, 2009 (CN) .......................... 2009 1 0216918

(51) Int. Cl.
*H04N 5/228* (2006.01)
(52) U.S. Cl. .................................................. 348/208.1
(58) Field of Classification Search ............. 348/208.99, 348/208.1, 208.3, 208.4, 208.6, 208.12, 208.13, 348/208.14; 382/107, 236
See application file for complete search history.

(56) References Cited

U.S. PATENT DOCUMENTS

| 7,649,549 B2 * | 1/2010 | Batur ......................... 348/208.6 |
| 8,120,661 B2 * | 2/2012 | Rabinowitz et al. ....... 348/208.6 |
| 8,149,286 B2 * | 4/2012 | Takagi et al. .............. 348/222.1 |
| 2006/0066728 A1 * | 3/2006 | Batur ...................... 348/208.99 |
| 2006/0244836 A1 * | 11/2006 | Batur ......................... 348/208.1 |
| 2010/0079606 A1 * | 4/2010 | Batur ......................... 348/208.6 |

* cited by examiner

*Primary Examiner* — Nicholas Giles
(74) *Attorney, Agent, or Firm* — Rosenberg, Klein & Lee

(57) ABSTRACT

An image motion sensing method applicable for an image sensing device includes the steps of capturing a plurality of sensing frames, each sensing frame including image position information of an image; selecting a base frame from the sensing frames and a sampling frame disposed after the base frame; comparing image position information of images in the base frame and the sampling frame within a base comparison range of the base frame and a sampling comparison range of the sampling frame to generate displacement information; determining a comparison range size according to the displacement information; updating sampling comparison range according to the comparison range size; selecting a sensing frame after the sampling frame as an updated sampling frame; updating the base comparison range of the base frame according to the comparison range size; and returning to the foregoing step of comparing the image position information.

10 Claims, 4 Drawing Sheets

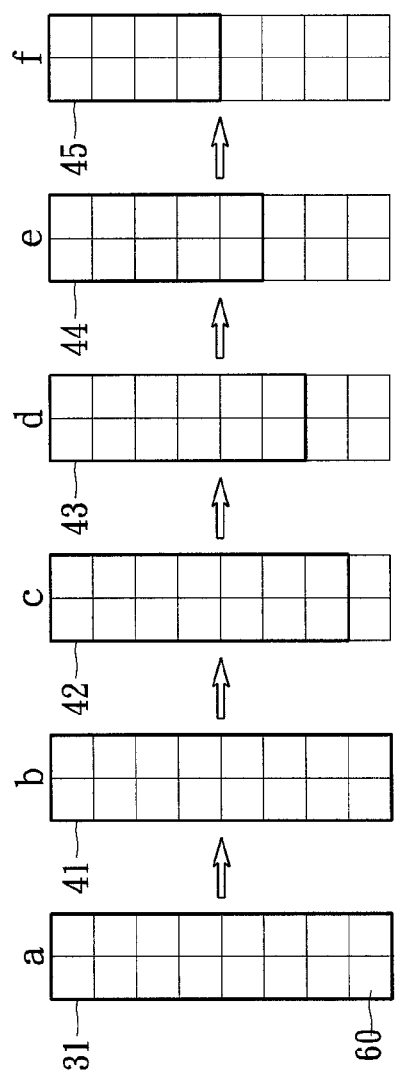
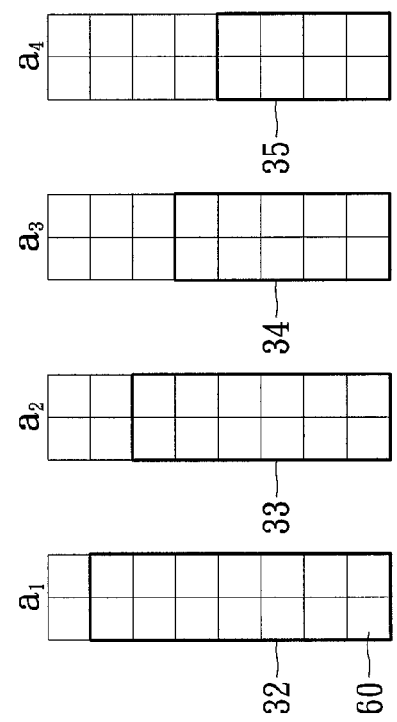
FIG. 3A
FIG. 3B

HIGH-RESOLUTION IMAGE SENSING DEVICE AND IMAGE MOTION SENSING METHOD THEREOF

BACKGROUND OF THE INVENTION

1. Field of the Invention

The present invention relates to an image sensing device and an image sensing method thereof, and more particularly to a high-resolution image sensing device and an image sensing method for detecting a motion direction precisely.

2. Description of Related Art

Image sensing device is provided for detecting a motion trajectory to determine the motion of the sensing device or even calculating a motion speed by consecutively detecting images and comparing the sensed images for any change. In the process of determining the motion trajectory, a processing unit installed in the image sensing device is used for sequentially comparing each sensed frame, and thus information such as displacement direction and displacement magnitude can be obtained by repeating the foregoing comparison and computation.

At present, a conventional way of calculating the motion trajectory is to adopt a previous frame and a following frame as base frames and a comparing frame accordingly for comparing an image position. If the comparison indicates no change of image positions in the aforementioned two frames, then the frame (which is the aforementioned previous frame) will be reserved as a base frame for later comparisons, and the comparing frame will be abandoned, and then the next frame will be used as a comparing frame to be compared with the original base frame. If there is a slight change of the image positions of two frames, then the conventional way replaces the original base frame by the current comparing frame as a new base frame. And the new base frame is used for the comparison of the next frame until the change of image positions has reached a threshold, e.g. a displacement of the image position equal to a pixel. This method can calculate a rotation angle or a deviation angle of a moving image sensing device.

SUMMARY OF THE INVENTION

Therefore, it is a primary objective of the present invention to provide a preferred embodiment of an image motion sensing method applicable for an image sensing device, and the method comprises the steps of: capturing a plurality of sensing frames, each sensing frame having image position information of an image; selecting a base frame from the sensing frames and a sampling frame disposed after the base frame; comparing the image position information of the image in a base comparison range of the base frame and the image position information of the image in a sampling comparison range of the sampling frame to generate a displacement information; determining a comparison range size according to the displacement information; updating the sampling comparison range according to the comparison range size; selecting one of the next sensing frames after the sampling frame and updating the next sampling frame, and applying the updated sampling comparison range to the updated sampling frame; updating the base comparison range of the base frame according to the comparison range size; and returning to the aforementioned step of comparing the image position information.

It is another objective of the present invention to provide a preferred embodiment of a high-resolution image sensing device, and the device comprises: a two-dimensional sensing unit, for sensing a plurality of sensing frames of an image continuously, and the sensing frames including image position information of the image; a recording unit, for recording the sensing frames, and comprising: a base buffer, for buffering a base frame of the sensing frames; and a sampling buffer, for buffering a sampling frame of the sensing frames; a processing unit, comprising a frame selecting unit, for selecting one of the sensing frames after the base frame as a sampling frame; an image comparing unit, for comparing the position of the image in the base frame with the position of the image in the sampling frame to generate displacement information of the image; a range selecting unit, for selecting at least a portion of the sampling frame according to the displacement information as a comparison range; wherein the frame selecting unit selects a next sensing frame after the sampling frame to update the sampling frame buffered in the sampling buffer according to the comparison result of the image comparing unit, and the range selecting unit selects the comparison range of the base frame according to the image position information of the base frame, and the image comparing unit compares the image positions in the comparison ranges of the base frame and the sampling frame respectively.

The objectives, technical measures and advantages of the present invention will become apparent with the detailed description of preferred embodiments and the accompanying drawings as follows.

BRIEF DESCRIPTION OF THE DRAWINGS

FIGS. 3A and 3B are schematic views comparing each sensing frame by a motion sensing method in accordance with a preferred embodiment of the present invention.

DETAILED DESCRIPTION OF THE PREFERRED EMBODIMENTS

Figure 1:
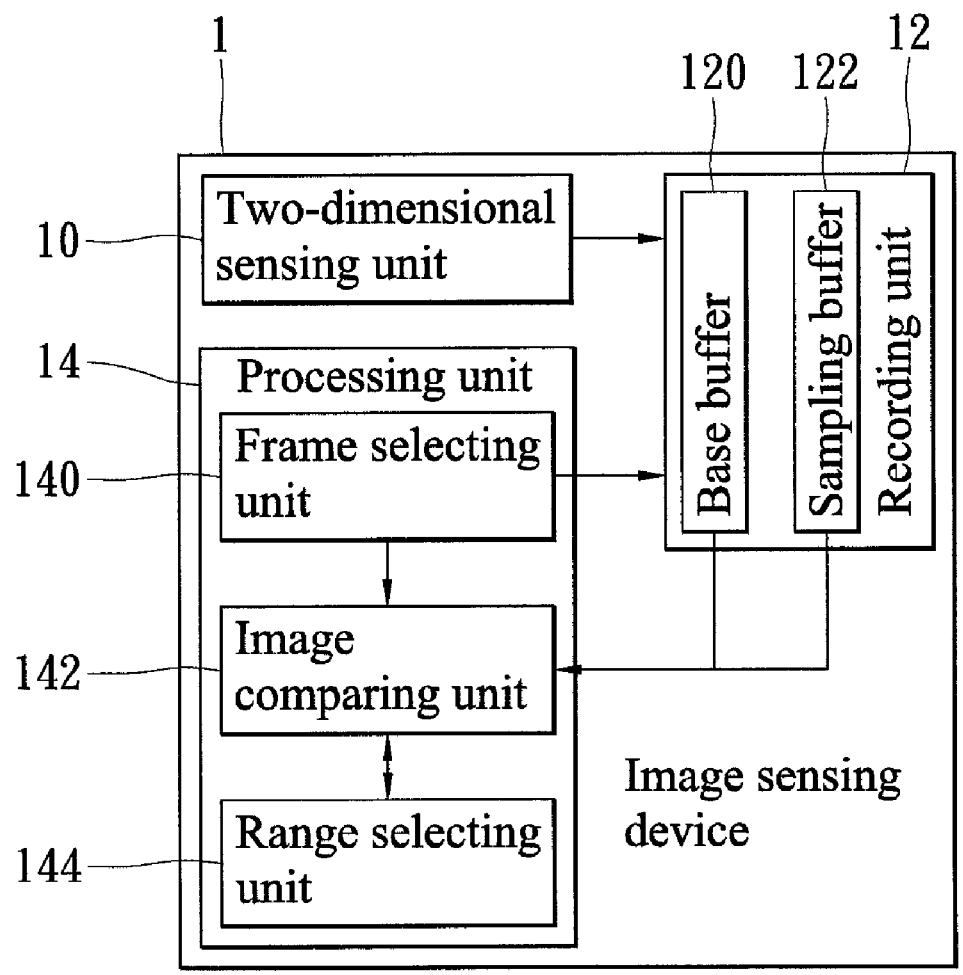
FIG. 1 is a block diagram of a high-resolution image sensing device in accordance with a preferred embodiment of the present invention.

With reference to FIG. 1 for a block diagram of a high-resolution image sensing device in accordance with a preferred embodiment of the present invention, the image sensing device 1 comprises a two-dimensional sensing unit 10, a recording unit 12 and a processing unit 14.

The two-dimensional sensing unit 10 includes a plurality of sensing elements, and each sensing element is provided for sensing an object to generate an optical signal to form and display a sensing frame of an image, and the two-dimensional sensing unit 10 further includes an area sensor or two or more rows of linear sensors arranged in parallel to each other and provided for continuously sensing a plurality of sensing frames while the image sensing device 1 is moving.

The recording unit 12 is provided for recording the sensing frames detected by the two-dimensional sensing unit 10, and each sensing frame includes a plurality of pixels corresponding to sensing elements and arranged in a two-dimensional array, and an object is sensed by the two-dimensional sensing unit 10 and each pixel sensed in the sensing frame presented is represented by an optical signal. The recording unit 12 further includes a base buffer 120 and a sampling buffer 122 for respectively buffering a base frame and a sampling frame selected from a plurality of consecutively detected sensing frames. The sampling frame is a sensing frame arranged sequentially after the base frame.

The processing unit 14 includes a frame selecting unit 140, an image comparing unit 142 and a range selecting unit 144, wherein the frame selecting unit 140 is provided for selecting the aforementioned base frame and sampling frame from the plurality of sensing frames, and storing the base frame and the sampling frame into the base buffer 120 and the sampling buffer 122 respectively. The image comparing unit 142 reads the frames stored in the two buffers 120, 122 and compares image position information of images in the base frame and the sampling frame to generate displacement information of the images in the two frames, wherein the displacement information includes a displacement magnitude and a displacement direction of an image in response to the base frame and the sampling frame.

The range selecting unit 144 computes a comparison range size for the next comparison according to the displacement information generated by the image comparing unit 142 and also determines the sampling comparison range of an image of the sampling frame buffered into the sampling buffer 122 which is supposed to be selected to perform image comparison next time in conjunction with the image position information of the reference frame in accordance with the image comparison this time. The sampling comparison range is the pixel range of the sampling frame. In addition, the range selecting unit 144 also determines the base comparison range of the base frame for the next comparison (which is the pixel range in the base frame selected for comparing with the sampling comparison range) according to the calculated comparison range size and the image position information of the image in the base frame.

After the frame selecting unit 140 has conducted the previous comparison and generated the displacement information, a sensing frame after the original sampling frame is used as a new sampling frame, and the new sampling frame is stored in the sampling buffer 122 and provided for the image comparing unit 142 to read the original base frame and the newly stored sampling frame from the two buffers 120, 122 respectively, as well as comparing the image position information of the images in the base frame and the new sampling frame to generate new displacement information according to the base comparison range and the sampling comparison range determined by the range selecting unit 144.

Since the sensed image is composed of a plurality of pixels arranged in a two-dimensional array, the displacement direction included in the displacement information may have two dimensions including displacements in x-axis direction and y-axis direction. If the image comparing unit 142 compares and determines that the displacement direction has only one dimension (such as the displacement in the y-axis direction only), the frame selecting unit 140 will not update the base frame, but will simply select the next sensing frame after the original sampling frame to update the sampling frame. However, if the comparison made by the image comparing unit 142 determines that the image position information in the base frame and the image position information in the sampling frame include a change of displacement direction in two dimensions, the frame selecting unit 140 will store the sensing frame after the original sampling frame into the sampling buffer 122 as a new sampling frame and also stores the original sampling frame into the base buffer 120 as a new base frame.

In the process of comparing the displacement information of the images by the image sensing device 1, if there is a change of directions in the two dimensions, the sampling frame will be updated, but the base frame will remain unchanged. Such arrangement allows the image sensing device 1 to recognize an inclination with a relatively small angle. Compared with the conventional way of using the displacement information of the previous and following sensing frames to determine the moving angle of the image sensing device, the present invention can calculate a motion trajectory of the image sensing device 1 more precisely. In addition, after each comparison, a base comparison range and a sampling comparison range are selected for the next comparison according to the displacement information of the image, such that the number of times for the image comparing unit 142 to process the pixels can be reduced to enhance the overall computability and performance of the processing unit 14.

Figure 2:
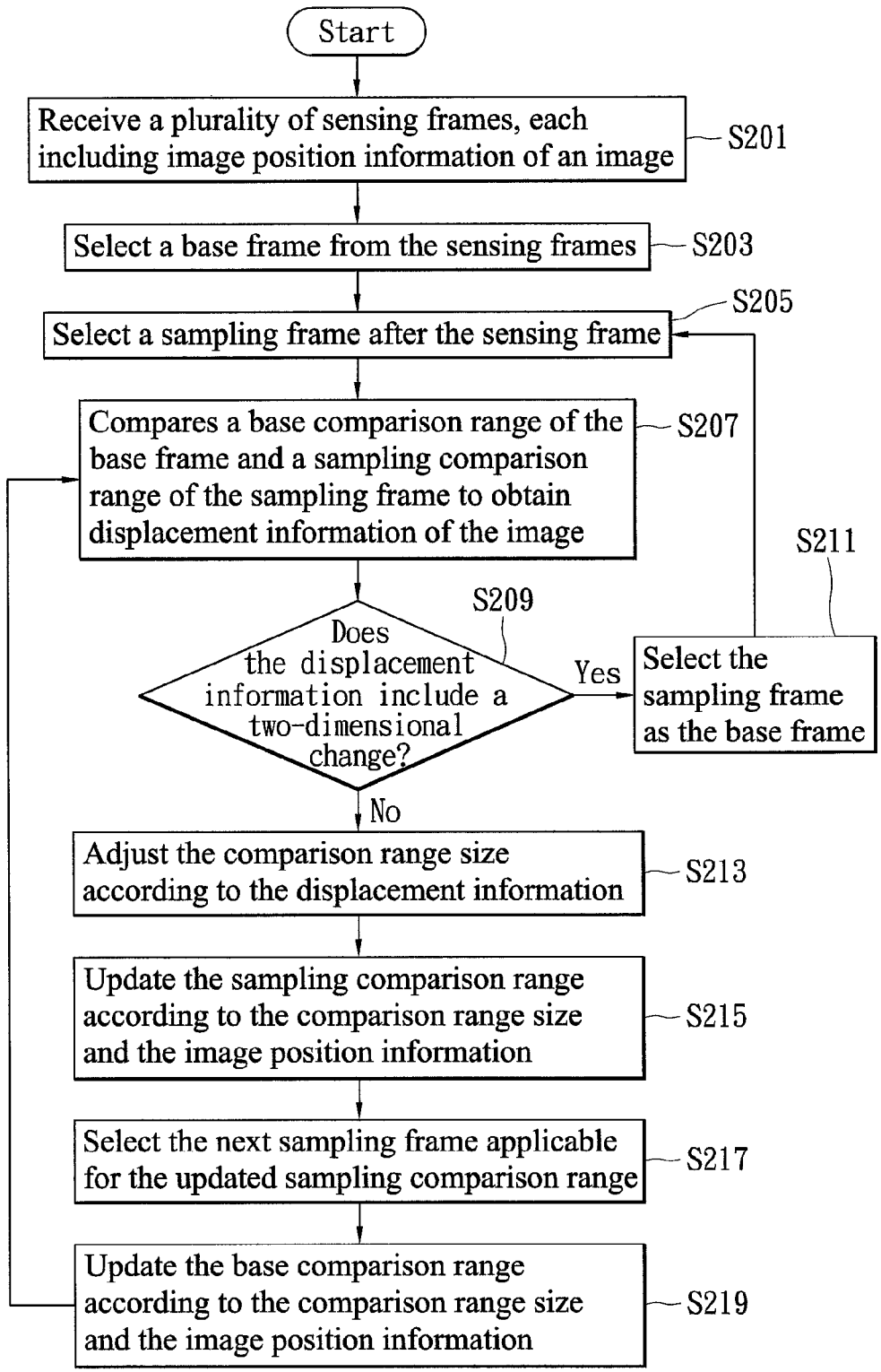
FIG. 2 is a flow chart of a motion sensing method in accordance with a preferred embodiment of the present invention.

With reference to FIG. 2 for a flow chart of an image motion sensing method in accordance with a preferred embodiment of the present invention as well as the components shown in FIG. 1, the method comprises the following steps. In Step (S201), the two-dimensional sensing unit 10 continuously receives a plurality of sensing frames including an image in a specific time interval, and each sensing frame includes image position information of the image. In Step (S203), the frame selecting unit 140 of the processing unit 14 selects a sensing frame from the sensing frames as a base frame and stores the base frame into the base buffer 120. In Step (S205), the frame selecting unit 140 selects a sensing frame (such as the next sensing frame after the base frame) as a sampling frame after the sensing frame has been selected as the base frame, and then stores the sampling frame into the sampling buffer 122. In Step (S207), the image in each sensing frame may vary with time associated with the movement of the image sensing device 1, and thus the image in each sensing frame may be situated at a different position, and the image position information of each sensing frame may be different, and the image position information includes pixel coordinates of an image in the sensing frame. The image comparing unit 142 installed in the processing unit 14 reads the base frame and the sampling frame selected by the frame selecting unit 140 from the base buffer 120 and the sampling buffer 122 respectively and compares the image position information of the images in the two frames in order to know about the change of the image position information of the two sensing frames after a period of time and generates the displacement information of the image. The displacement information includes a displacement magnitude and a displacement direction of the image produced in the two frames. In Step (S209), this step determines whether or not the displacement direction of the displacement information has a change in two dimensions. In other words, the step determines whether or not there is any change of the position information of the image in the sampling frame and the position information of the image in the base frame in both x-axis and Y-axis directions.

In Step (S211), if there is a change in two dimensions, then the image position information including the displacement magnitude and the displacement direction of the two compared frames can be used for calculating the angle of movement of the image sensing device 1. In order to continue detecting the motion of the image sensing device 1, the current sampling frame is stored into the base buffer 120 as a new base frame, and the procedure returns to Step (S205) to perform the next comparison.

In Step (S213), if the comparison indicates that the displacement information includes the displacement direction of only one dimension; for example, the image is moved simply in a direction of one of the two dimensions (such as a vertical or horizontal displacement), or if there are a change in the directions of the two dimensions, and the displacement magnitude of the first dimension (such as the x-axis direction) is greater than the displacement magnitude of the second dimension (such as the y-axis direction), the image is considered to have a change of movement in the second dimension (which is the y-axis) only. The displacement information obtained after the comparison takes place is used for adjusting the comparison range size. For example, if the displacement direction of the displacement information shows that there is a displacement of two pixels in the direction of the first dimension (or y-axis) of the two dimensions, then the comparison range size of the entire sensing frame of the image will be reduced to a size of two pixels in the first-dimension direction.

In Step (S215), it is necessary to determine the reduced size of the comparing frame to be applied to which part of the sampling frame and the base frame after the comparison range size is adjusted. The range selecting unit 144 determines a starting sampling position of the image in the frame according to the comparison range size and the sampling frame to determine the sampling comparison range for the next sampling frame to be used for the comparison. In Step (S217), the frame selecting unit 140 selects the next sensing frame as a new sampling frame after the sampling comparison range is determined, and this sampling frame is applicable for the sampling comparison range determined in Step (S215). In Step (S219), if the sampling comparison range of the sampling frame used for the comparison and computation has changed, it is necessary to adjust the comparison range in the base frame accordingly so as to compute the pixel data successfully. The image comparing unit 142 updates the base comparison range of the base frame according to the comparison range size and the image position information of the base frame to facilitate the comparison with the new sampling frame, and then return to Step (S207). In the updated sampling comparison range and the updated base comparison range, the images are compared to obtain new displacement information.

With reference to FIGS. 3A and 3B for a preferred embodiment of the present invention, FIG. 3A shows that a plurality of sensing frames a to f detected sequentially by a two-dimensional sensing unit in a specific time interval. Each sensing frame is composed of an array having 2 pixels (0 to 1) in the x-axis direction and 8 pixels (0 to 7) in the y-axis direction, wherein each sensing frame a to f contains an image 60, and the pixel position (or image position information) of the image 60 in each sensing frame a to f varies. For example, the first sensing frame a has an image 60 at a pixel position (0, 0), and the pixel position of the image 60 falls into a range between (0, 1) and (1, 1) for the second sensing frame b, and the pixel positions of the image 60 in the following sensing frames c to e fall between the first pixel and the second pixel in the x-axis direction, and there is an increment of one pixel displaced in the positive direction of the y-axis till it reaches the sensing frame f. The pixel position of the image 60 associated with the sensing frame f is shifted to (1, 5).

In this preferred embodiment, the frame selecting unit selects the sensing frame a and the sensing frame b as a base frame and a sampling frame respectively, and the image comparing unit compares the image position information of the image 60 within a base comparison range 31 of the base frame and a sampling comparison range 41 of the sampling frame. Since the sensing frames a and b are the first two sensing frames in this preferred embodiment, the comparison range covers all two-dimensional pixels of the entire sensing frame. The image position information in the base frame is (0, 0), and the image position information of the sampling frame is (0, 1) obtained after the comparison takes place has a displacement direction moved in the positive direction of the y-axis, wherein the displacement magnitude is a displacement information of 1 pixel.

Since there is a displacement direction of only one dimension, therefore the frame selecting unit will not update the base frame, but will remain as the sensing frame a, and the comparison range size is calculated continuously according to the displacement information. In this preferred embodiment, the image is displaced by 1 pixel in the y-axis direction, and the calculated comparison range size is reduced by 1 pixel from the y-axis direction, and thus the original comparison range size having a 2×8 array is reduced to one having a 2×7 array. After the comparison range size is adjusted, the starting sampling position of the comparison range size applicable for the sampling frame are calculated according to the image position information of the image in the sampling frame, such that a sampling comparison range of the sampling frame can be obtained. In this embodiment, the image position information of the sensing frame b used as the sampling frame and the comparison range of the sampling frame are used as the starting sampling position for the calculation of the 2×7 array of pixels starting at (0, 1). In other words, the pixel positions are restricted within the range from (0, 1) to (1, 7) of the sensing frame b.

The frame selecting unit selects a sensing frame c to replace the sensing frame b with a new sampling frame, and the aforementioned calculation can be applied to obtain the sampling comparison range, and the pixel positions falling within the range from (0, 1) to (1, 7) of the sensing frame c are used as the sampling comparison range 42 for the comparison.

To compare the pixels in the sampling comparison range, the same comparison range size of the base frame is used, so that the 2×7 array pixel positions of the base frame are retrieved and used as the base comparison range 32 (refer to a1 in FIG. 3B) according to the image position information (0, 0) of the image 60, which are also the pixel positions included within the range from (0, 0) to (1, 6), wherein the pixel position (0, 0) is the starting base position of the base comparison range 32.

Then, the processing unit can compare the image position information of an image 60 within the base comparison range 32 (refer to a1 of FIG. 3B) of the base frame a and the sampling comparison range 42 of the updated sampling frame (which is the sensing frame c).

In the base comparison range 32 and the sampling comparison range 42, the displacement direction of the image 60 is still the positive direction along the y-axis, and the change of the displacement magnitude shows a displacement of 1 pixel from the starting position of the base comparison range 32 and in the y-axis direction to the second position along the y-axis direction of the sampling comparison range 42, so that if it is necessary to calculate the next comparison range size, then the displacement information obtained by comparing the sampling comparison ranges 42 of the sampling frame c and base frame a can be used for the comparison. After the comparison range size is further adjusted to a 2×6 array, and the next sensing frame d is selected as a new sampling frame according to the position information of an image in the sampling frame c, the range of the pixel positions from (0, 2) to (1, 7) of the sensing frame d is used as the sampling comparison range 43. The pixels in the 2×6 array starting from (0, 0) of the sensing frame are selected as the base comparison range 33 (refer to a2 in FIG. 3B) of the base frame according to the updated comparison range size.

Similarly, the sensing frame e is selected as a sampling frame, and the range of image positions from (0, 3) to (1, 7) is selected as the sampling comparison range 44, and the range from (0, 0) to (1, 4) of the base frame is selected as the base comparison range 34 (refer to a3 in FIG. 3B), and so forth.

In this preferred embodiment, the procedure continues until the sensing frame f is selected as the sampling frame, and the image position information are compared within the sampling comparison range 45 and the base comparison range 35 of the base frame (refer to a4 in FIG. 3B) to obtain the displacement information, wherein the image in the sampling comparison range 45 is displaced by 1 pixel with respect to the image in the base comparison range 35 in both x-axis direction and y-axis direction. In other words, there is a direction displacement in two dimensions. Now, the image position information (0, 0) of the image in the first base frame a and the image position information (1, 5) of the image in the last sampling frame f are used for calculating the deviated angle when the image sensing device is moved in the y-axis direction. In addition, the sensing frame f is used as a new base frame for the continuous comparisons with other sensing frames after the sensing frame f.

Figure 4:
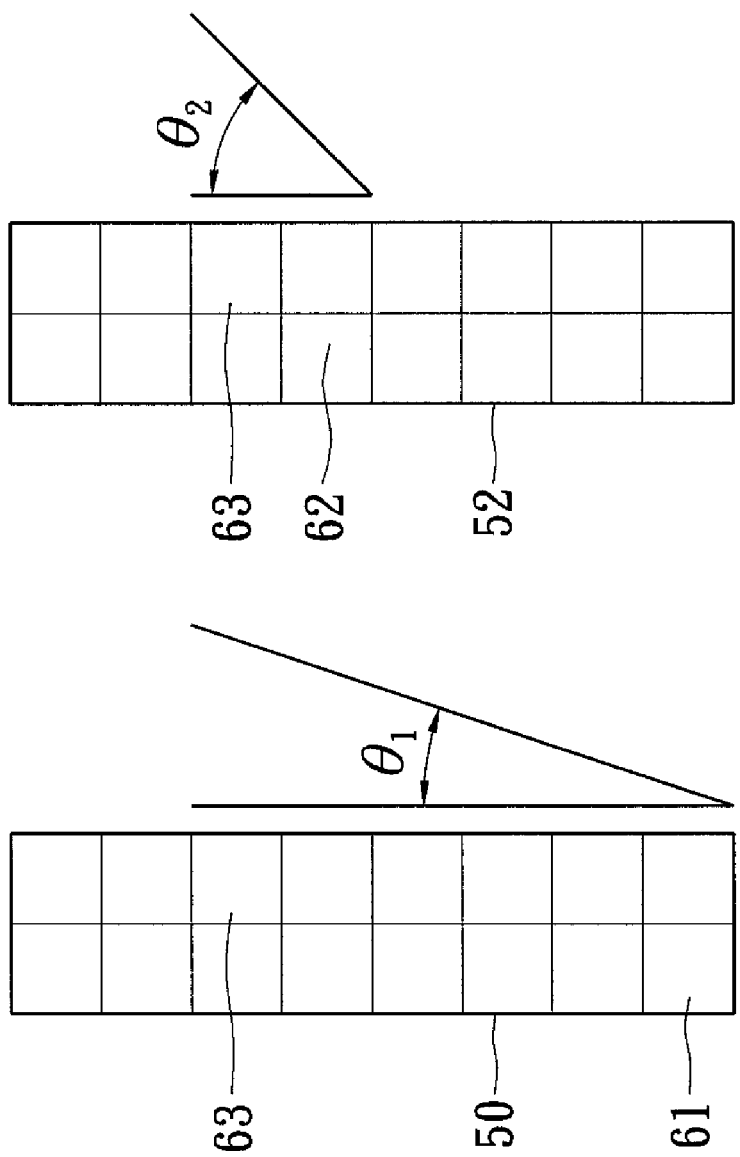
FIG. 4 is a schematic view of a motion angle produced according to an image displacement.

According to the displacement information of the image calculated in accordance with the foregoing preferred embodiment, even a change of the trajectory with a small angle can be recognized. In FIG. 4, the base image position 61 and the sampling image position 63 in the frame 50 are displacement information obtained by comparing the image positions of the sensing frame a and the sensing frame f and used for calculating a movement of the image sensing device during the time of shifting from the sensing frame a to the sensing frame f primarily in the y-axis direction, but there is an inclination $\theta1$ in the x-axis direction. On the other hand, the base image position 62 (0, 4) and the sampling image position 63 (1, 5) of the frame 52 are data obtained from the previous sensing frame and the following sensing frame. Even if there are displacement magnitudes in both x-axis direction and y-axis direction, the calculated inclination $\theta2$ can be a large angle such as 45 degrees, and thus there is a too-large discrepancy of the actual motion direction of the image sensing device.

The image sensing device of the present invention simply requires two rows of linear sensors. The larger quantity of sensing elements of the linear sensors is; the larger quantity of angles can be divided within an angular range. The number of rows of linear sensors, the plurality of linear sensors arranged in a horizontal direction and a vertical direction, or the sensing units which are area sensors increases, the actual motion direction of the image sensing device can be represented more precisely.

The above-mentioned descriptions represent merely the preferred embodiments of the present invention, without any intention to limit the scope of the present invention thereto. Various equivalent changes, alternations, or modifications based on the claims of the present invention are all consequently viewed as being embraced by the scope of the present invention.

What is claimed is:

1. A high-resolution image sensing device, comprising:
    a two-dimensional sensing unit, for consecutively sensing a plurality of sensing frames, each including an image and an image position information of the image;
    a recording unit, for recording the sensing frames, and comprising:
        a base buffer, for buffering a base frame of the sensing frames; and
        a sampling buffer, for buffering a sampling frame of the sensing frames;
    a processing unit, comprising:
        a frame selecting unit, for selecting one of the sensing frames after the base frame as the sampling frame;
        an image comparing unit, for comparing image positions of the base frame and the sampling frame according to the image position information to generate a displacement information of the image; and
        a range selecting unit, for selecting at least a portion of the sampling frame according to the displacement information as a comparison range;
    wherein, the frame selecting unit selects a next sensing frame after the sampling frame and updates the next sensing frame as the sampling frame temporarily stored in the sampling buffer with respect to a comparison result of the image comparing unit, and the range selecting unit selects a comparison range of the base frame according to the image position information of the base frame, and the image comparing unit compares the image positions of the images in the comparison range of the base frame and the comparison range of the sampling frame respectively.

2. The high-resolution image sensing device of claim 1, wherein the two-dimensional sensing unit includes a plurality of sensing elements, and the sensing frames include a plurality of pixels corresponding to the sensing elements respectively.

3. The high-resolution image sensing device of claim 2, wherein the two-dimensional sensing unit is an area sensor or two or more linear sensors arranged adjacent to each other.

4. The high-resolution image sensing device of claim 1, wherein the frame selecting unit stores the selected base frame and the selected sampling frame into the base buffer and the sampling buffer respectively.

5. The high-resolution image sensing device of claim 1, wherein the frame selecting unit stores the selected base frame into the base buffer and selects a frame in the comparison range of the sampling frame and stores the frame into the sampling buffer.

6. The high-resolution image sensing device of claim 1, wherein the displacement information includes a displacement direction and a displacement magnitude of the image, and the displacement magnitude includes a first-dimension displacement magnitude and a second-dimension displacement magnitude, and if there are changes in both first-dimension displacement magnitude and second-dimension displacement magnitude, the frame selecting unit will update the sampling frame as a new base frame.

7. An image motion sensing method, applicable for an image sensing device, which includes a two-dimensional sensing unit, a recording unit and a processing unit, and the method comprising the steps of:
    capturing a plurality of sensing frames, and the sensing frame including image position information of an image, and each of the sensing frames being composed of a plurality of pixels arranged in a two-dimensional array;
    selecting a base frame from the sensing frames;
    selecting a sampling frame from the sensing frames, and the sampling frame being captured sequentially after the base frame;
    comparing the image position information of the image in a base comparison range of the base frame and the image position information of the image in a sampling comparison range of the sampling frame to generate a displacement information;
    determining a comparison range size according to the displacement information;

updating the sampling comparison range according to the comparison range size;

selecting one of the next sensing frames after the sampling frame and updating the next sensing frame as the sampling frame, and applying the updated sampling comparison range to the updated sampling frame;

updating the base comparison range of the base frame according to the comparison range size; and returning to the aforementioned step of comparing the image position information.

8. The image motion sensing method of claim 7, wherein the displacement information includes a displacement magnitude and a displacement direction of the image, and the sampling comparison range includes a starting sampling position of the sampling comparison range in the sampling frame.

9. The image motion sensing method of claim 8, wherein the step of updating the sampling comparison range according to the comparison range size further comprises the steps of:

updating the starting sampling position of the sampling comparison range according to the displacement information; and determining the updated sampling comparison range of the sampling frame according to the updated starting sampling position and the comparison range size.

10. The image motion sensing method of claim 8, wherein the step of updating the base comparison range according to the comparison range size further comprises the step of:

determining an updated base comparison range of the base frame according to the image position information and the comparison range size.

* * * * *